(12) United States Patent
Yasaki

(10) Patent No.: US 9,706,062 B2
(45) Date of Patent: Jul. 11, 2017

(54) IMAGE READING APPARATUS WITH READING POSITION DETERMINATION UNIT THAT DETERMINES READING POSITION FOR ORIGINAL

(71) Applicant: CANON KABUSHIKI KAISHA, Tokyo (JP)

(72) Inventor: Kosuke Yasaki, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/046,928

(22) Filed: Feb. 18, 2016

(65) Prior Publication Data

US 2016/0248920 A1 Aug. 25, 2016

(30) Foreign Application Priority Data

Feb. 23, 2015 (JP) ................................. 2015-032773

(51) Int. Cl.
*H04N 1/00* (2006.01)

(52) U.S. Cl.
CPC ..... *H04N 1/00082* (2013.01); *H04N 1/00013* (2013.01); *H04N 1/00037* (2013.01); *H04N 1/0057* (2013.01); *H04N 1/00063* (2013.01); *H04N 1/00092* (2013.01)

(58) Field of Classification Search
USPC ........................................................ 358/1.5
See application file for complete search history.

(56) References Cited

U.S. PATENT DOCUMENTS

| 6,563,938 | B1 | 5/2003 | Harada | |
| 8,274,673 | B2 * | 9/2012 | Okumura | H04N 1/00002 358/1.13 |
| 9,219,837 | B2 * | 12/2015 | Koyama | H04N 1/00477 |
| 2007/0188828 | A1 * | 8/2007 | Suzuki | H04N 1/4097 358/474 |
| 2013/0265351 | A1 * | 10/2013 | Matsuda | B41J 3/407 347/5 |
| 2014/0204433 | A1 * | 7/2014 | Koyama | H04N 1/00909 358/496 |
| 2014/0306395 | A1 * | 10/2014 | Suzuki | B65H 35/04 270/18 |

(Continued)

FOREIGN PATENT DOCUMENTS

JP 2004179818 A 6/2004

*Primary Examiner* — Jerome Grant, II
(74) *Attorney, Agent, or Firm* — Rossi, Kimms & McDowell LLP

(57) ABSTRACT

An image reading apparatus which is capable of, even when there are foreign objects on a reading glass, determining a position unlikely to be adversely affected by the foreign objects as a reading position and reading an image. An original is conveyed to a reading area on the reading glass, and a reading unit reads the original at a reading position within the reading area. Foreign objects adhered to a plurality of candidate reading positions are detected using image data read at the plurality of candidate reading positions within the reading area by the reading unit in a state where the original is not being conveyed. A density of the foreign objects is measured, and a reading position at which the original is read is selected from among the candidate reading positions according to the density of the foreign objects.

11 Claims, 11 Drawing Sheets

(56) References Cited

U.S. PATENT DOCUMENTS

2016/0180204 A1* 6/2016 Imoto .................. B41J 11/00
                                                    358/1.12
2016/0241723 A1* 8/2016 Okamoto ........... H04N 1/00037

* cited by examiner

IMAGE READING APPARATUS WITH READING POSITION DETERMINATION UNIT THAT DETERMINES READING POSITION FOR ORIGINAL

BACKGROUND OF THE INVENTION

Field of the Invention

The present invention relates to an image reading apparatus with a reading position determination unit that determines a reading position for an original.

Description of the Related Art

There is conventionally known an image reading position apparatus which conveys originals mounted on an original tray one by one using an automatic document feeder (ADF), irradiates an original at a reading position with light from a light source, and causes reflected light to fall on image pickup devices such as CCDs to read an image off the original.

In the image reading apparatus with the ADF, smudges may adhere to a reading glass above a reading position due to sheet powder of an original itself which is being conveyed or coming-off of toners printed on the original. When an original is read while being moved with smudges such as sheet powder or toners adhered to the reading glass, light that irradiates a surface of the original is blocked by the smudges, and hence vertical streaks may appear in the read image at positions corresponding to places to which the smudges are adhered. Thus, in the image reading apparatus that reads an image off an original while conveying the original, it is preferred that a position on the reading glass at which there is no smudge is determined as an original reading position, and the original is read at this original reading position.

For image reading apparatuses having a reading position determination unit, there has been proposed a technique that, in a reading position setting mode, detects the presence or absence of smudges in an image which has been read at a predetermined reading position, and when it is judged that there are smudges, changes a reading position to detect the presence or absence of smudges again (see Japanese Laid-Open Patent Publication (Kokai) No. 2004-179818 and U.S. Pat. No. 6,563,938). When it is judged that there is no smudge in an image read at the changed reading position, an image is read off an original at this reading position.

However, according to the technique described above, a position on the reading glass at which there is no smudge is determined as a reading position, and this raises a problem that when, for example, smudges are not completely avoided due to the reading glass being too dirty, an image cannot be read in a satisfactory manner.

SUMMARY OF THE INVENTION

The present invention provides an image reading apparatus which is capable of, even when there are foreign objects on a reading glass, determining a position unlikely to be adversely affected by the foreign objects as a reading position and reading an image.

Accordingly, the present invention provides an image reading apparatus comprising a conveying unit configured to convey an original to a reading area, a reading unit configured to read the original at a reading position within the reading area, a detection unit configured to detect foreign objects adhered to a plurality of candidate reading positions using image data read at the plurality of candidate reading positions within the reading area by the reading unit in a state where the original is not being conveyed, a measurement unit configured to measure a density of the foreign objects detected by the detection unit, and a determination unit configured to determine a reading position at which the original is read from among the candidate reading positions according to the density of the foreign objects measured by the measurement unit.

Further features of the present invention will become apparent from the following description of exemplary embodiments (with reference to the attached drawings).

BRIEF DESCRIPTION OF THE DRAWINGS

FIG. 7D is a view showing an image read off an original after vertical streaks corresponding to the smudges in FIG. 7B are corrected for, and FIG. 7E is a view showing an image read off an original after vertical streaks corresponding to the smudges in FIG. 7C are corrected for.

DESCRIPTION OF THE EMBODIMENTS

Hereafter, embodiments will be described in detail with reference to the drawings.

Figure 1:
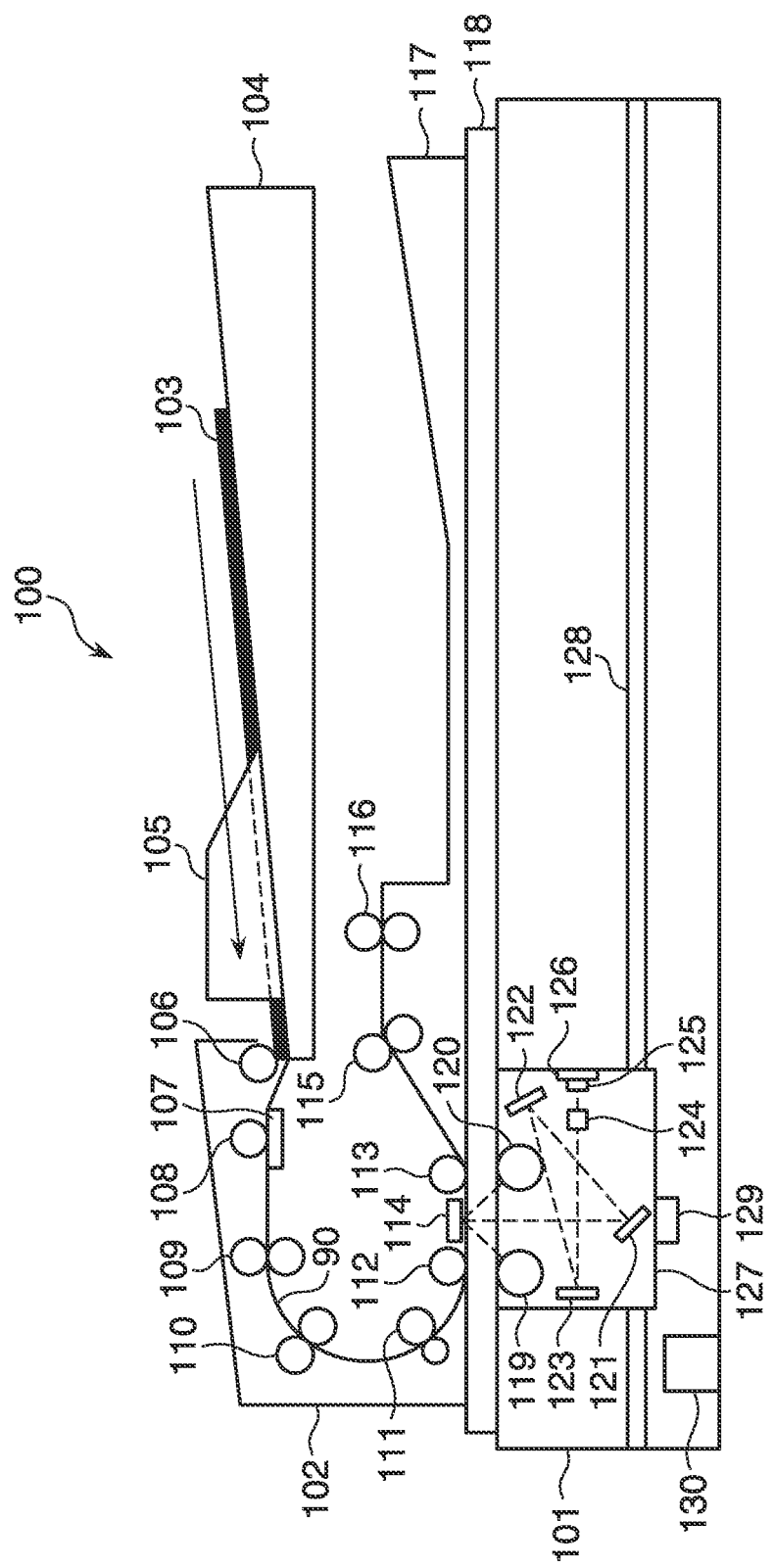
FIG. 1 is a cross-sectional view schematically showing an arrangement of an image reading apparatus according to a first embodiment.

FIG. 1 is a cross-sectional view schematically showing an arrangement of an image reading apparatus according to a first embodiment.

Referring to FIG. 1, the image reading apparatus 100 is comprised mainly of a reader unit 101 which reads an original, and an ADF 102 which conveys an original to a reading position for the reader unit 101.

The ADF 102 has an original tray 104, a pickup roller 106, which is provided above an end of the original tray 104 in a sheet feeding direction, a curved conveying path 90 on which an original is conveyed, and a discharged-sheet tray 117.

The original tray 104 has a width restriction plate 105 which restricts the width of an original. An original batch 103 is mounted on an original mounting surface of the original tray 104, and two sides of the original batch 103 in a conveying direction are restricted by the width restriction plate 105 to prevent skewed conveyance of originals.

A separation unit comprised of a separation roller 108 and a separation pad 107 is provided at an entrance of the conveying path 90. The original batch 103 is delivered to the separation unit by the pickup roller 106. In the separation unit, originals are separated one by one from the uppermost part of the original batch 103 by the separation pad 107 and the separation roller 108.

First registration rollers 109, second registration rollers 110, first conveying rollers 111, a second conveying roller 112, a third conveying roller 113, fourth conveying rollers 115, and sheet discharging rollers 116 are provided downstream of the separation roller 108 on the conveying path 90. A reading position at which an image is read lies between the second conveying roller 112 and the third conveying roller 113, and a white color opposed member 114 is provided in opposed relation to the reading position. Skewed conveyance of an original separated by the separation roller 108 is corrected for by the first registration rollers 109, and the original is conveyed toward the discharging-sheet tray 117 via the second registration rollers 110, the first conveying rollers 111, the second conveying roller 112, and the third conveying roller 113.

At the reading position between the second conveying roller 112 and the third conveying roller 113, an original is read by a reading unit, to be described later. The original that has passed through the third conveying roller 113 is then discharged onto the discharged-sheet tray 117 via the fourth conveying rollers 115 and the sheet discharging rollers 116.

The reader unit 101 is disposed below the ADF 102 and has a reading glass 118 opposed to the white color opposed member 114 of the ADF 102. The reading unit 127 is disposed at a location opposed to the white color opposed member 114 across the reading glass 118. The reading unit 127 is movable and has light sources 119 and 120, reflecting mirrors 121 to 123, an image forming lens 124, a line sensor 125, and a signal processing substrate 126.

The reading unit 127 irradiates an original, which is passing through a reading position set within a reading area on the reading glass 118 opposed to the white color opposed member 114, with light from the light sources 119 and 120 and guides reflected light to the image forming lens 124 via the reflecting mirrors 121 to 123. Light converged on the image forming lens 124 forms an image on the line sensor 125 in which image pickup devices such as CCDs are placed in a line. The light that has formed the image is converted into an electric signal by the line sensor 125, converted into a digital signal by the signal processing substrate 126, and then subjected to image processing. The reading unit 127 acts as a moving original reading unit at this time but may act as a fixed original reading unit that reads an original stopped within the reading area.

Figure 2:
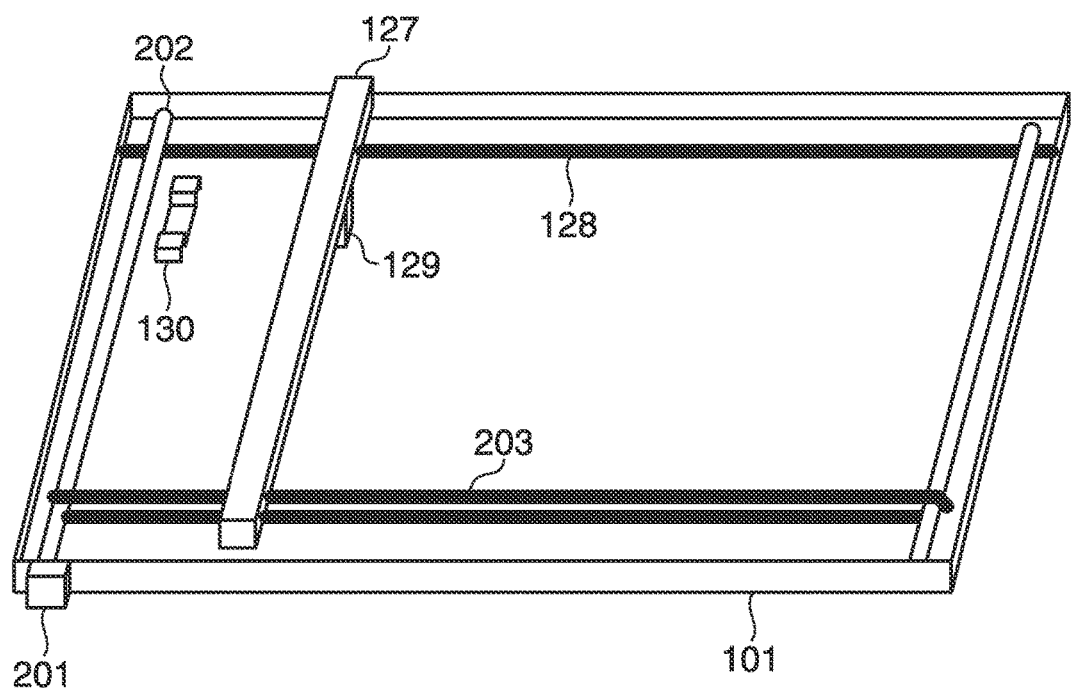
FIG. 2 is a view schematically showing an internal arrangement of a reader unit in the image reading apparatus in FIG. 1.

FIG. 2 is a view schematically showing an internal arrangement of the reader unit 101 of the image reading apparatus in FIG. 1.

Referring to FIG. 2, the reading unit 101 has the reading unit 127, a rail 128 which movably supports the reading unit 127, a belt 203 to which an end of the reading unit 127 is fixed, a rotary shaft 202, and a drive motor 201 which drives the rotary shaft 202. A bottom plate of the reading unit 127 has a projecting portion 129. A flag sensor 130 which senses the projecting portion 129 is disposed at a specific position below the projecting portion 129. The flag sensor 130 detects a position of the reading unit 127 by sensing the projecting portion 129.

When the drive motor 201 is run, its torque is transmitted to the rotary shaft 202, which in turn rotates. When the rotary shaft 202 rotates, the belt 203 engaged with the rotary shaft 202 turns leftward or rightward as viewed in FIG. 2 according to a rotating direction of the rotary shaft 202. In response to turning of the belt 203, the reading unit 127 attached to the belt 203 moves leftward or rightward as viewed in FIG. 2.

Along with the movement of the reading unit 127, the projecting portion 129 at the bottom plate thereof moves and passes through a position opposed to the flag sensor 130, and as a result, the flag sensor 130 senses the reading unit 127 and generates a pulsed signal. Based on the generated signal, it is detected that the reading unit 127 has passed through the position opposed to the flag sensor 130. A reading unit position detected by the flag sensor 130 is a reference position of the reading unit 127. This reference position is used as a reference in controlling a position of the reading unit 127. Namely, a position of the reading unit 127 relative to the reference position is determined based on the number of driving pulses for the drive motor 201 from a time point at which the reading unit 127 passes through the position opposed to the flag sensor 130. As a result, a position of the reading unit 127 is determined even when it is moving.

Figure 3:
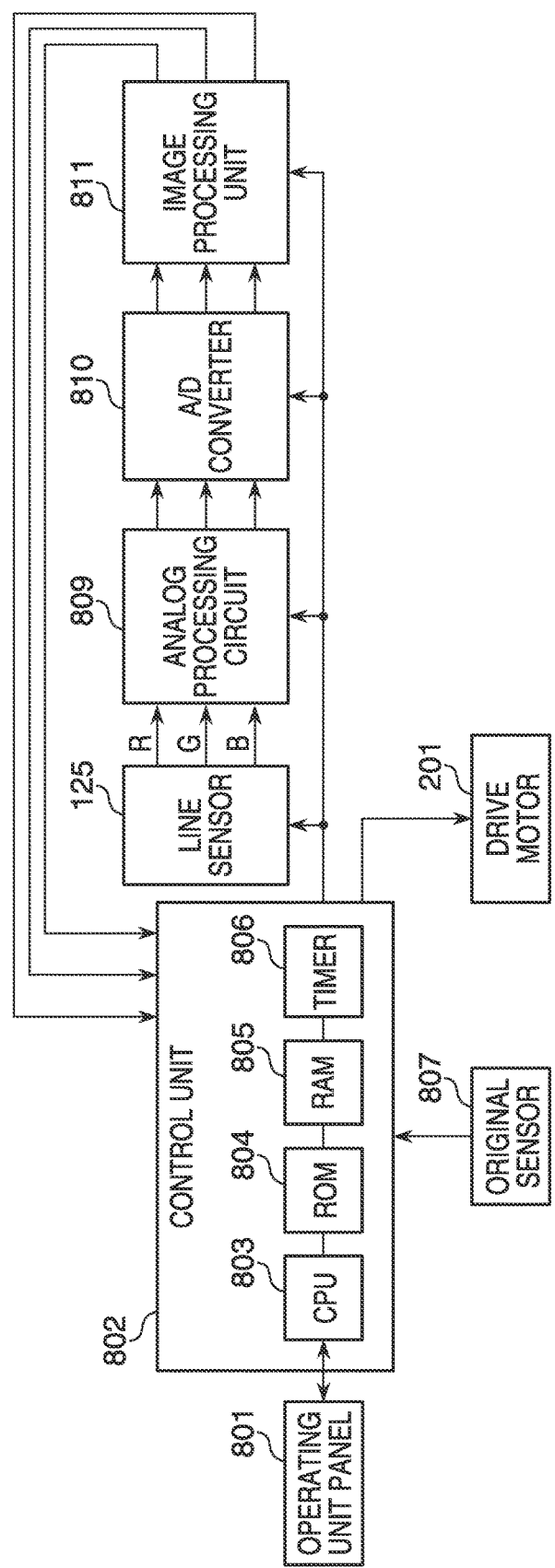
FIG. 3 is a block diagram showing a control arrangement of the image reading apparatus in FIG. 1.

FIG. 3 is a block diagram showing a control arrangement of the image reading apparatus in FIG. 1.

The image reading apparatus 100 has a control unit 802. Referring to FIG. 3, the control unit 802 has a CPU 803, a ROM 804, a RAM 805, and a timer 806. The CPU 803 is connected to the ROM 804, the RAM 805, and the timer 806. The CPU 803 is connected to an operating unit panel 801, and the control unit 802 is connected to an original sensor 807 and the drive motor 201.

The control unit 802 is communicatively connected to the line sensor 125, an analog processing circuit 809, an A/D converter 810, and an image processing unit 811. The line sensor 125 and the analog processing circuit 809 are communicatively connected together, the analog processing circuit 809 and the A/D converter 810 are communicatively connected together, and the A/D converter 810 and the image processing unit 811 are communicatively connected together.

The CPU 803 provides various types of control, and for example, starts and finishes conveyance of an original and drivingly controls drive units of the image reading apparatus 100. The operating unit panel 801 is an operating screen mainly for a user to, for example, set the number of copies to be made from an original and start copying. In the ROM 804, data unique to operating units is stored, and adjustment values required for various types of processes such as original conveyance and image processing. The RAM 805 is used as a storage unit in temporarily storing data and performing calculations mainly when carrying out image processing or original conveyance.

The timer 806 is a time counter for use in measuring and determining time periods required for various types of control and times at which various types of control are started, and generating interrupt signals. The line sensor 125 is for reading an image off an original and comprised of image pickup devices such as CCDs formed in a line in a direction vertical to a direction in which an original to be read while being moved is conveyed. In an image reading apparatus which reads color images, line sensors 125 for three colors are prepared, for example, in parallel, and incident light is decomposed into R, G, and B colors and received by color filters provided on front surfaces of the respective sensors. The received light is converted into an electric signal through photoelectric conversion and input as an analog signal to the analog processing circuit 809.

The signal adjusted by the analog processing circuit 809 is converted into digital data by the A/D converter 810, then sent to the image processing unit 811, and subjected to image processing by the image processing unit 811. The image processing unit 811 performs processing so that pixels of the line sensor 125 do not vary in luminance when objects with the same density are read. Specifically, the image processing unit 811 reads the white color opposed member 114 (see FIG. 1) the density of which is controlled to be uniform, corrects shading so that luminance data are read as the same luminance values when objects with the same density are read, and after that, outputs the resulting data as image data.

A description will now be given of an image reading process using the image reading apparatus 100 in FIG. 1.

Figure 4:
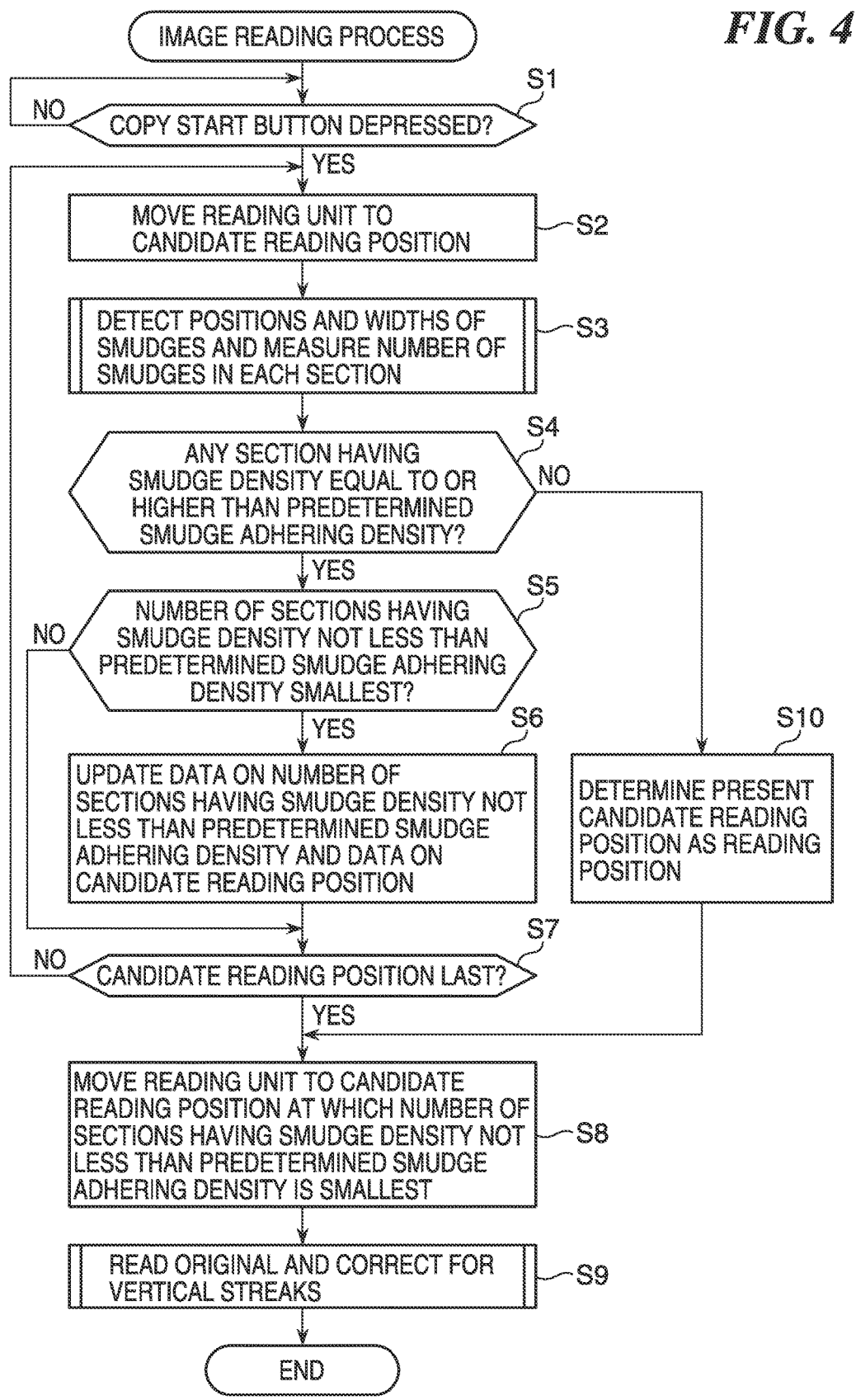
FIG. 4 is a flowchart showing the procedure of an image reading process which is carried out by the image reading apparatus in FIG. 1.

FIG. 4 is a flowchart showing the procedure of the image reading process which is carried out by the image reading apparatus 100 in FIG. 1. The image reading process is carried out by the CPU 803 of the control unit 802 in accordance with an image reading process program stored in the ROM 804.

Referring to FIG. 4, first, the CPU 803 judges whether or not a copy start button on the operating unit panel 801 has been depressed by a user, and stands by until the copy start button is depressed (step S1). When the copy start button has been depressed ("YES" in the step S1), the CPU 803 controls the drive motor 201 to move the reading unit 127 from the present position to a candidate reading position (step S2).

The candidate reading position means a position in a main scanning direction at a predetermined position in a sub scanning direction within the reading area on the reading glass 118 which is opposed to the white color opposed member 114 and is a candidate position at which the reading unit 127 reads an image off an original. The main scanning direction corresponds to a longitudinal direction of the line sensor 125. On the other hand, the sub scanning direction corresponds to a conveying direction of an original and is perpendicular to the main scanning direction.

After the CPU 803 causes the reading unit 127 to move to the candidate reading position, the process proceeds to step S3. Specifically, the CPU 803 controls the reading unit 127 to read the white color opposed member 114 at the candidate reading position and receives image data of one line which has been subjected to image processing from the image processing unit 811. Then, based on the received image data, the CPU 803 then detects positions and widths (sizes) of smudges at the candidate reading position and counts the number of smudges $D_X$ with respect to each of a plurality of sections determined in advance (step S3). A smudge detecting process in which the presence or absence of smudges which are foreign objects and the number, positions, and sizes of smudges are detected will be described later as a subroutine of the step S3.

Figure 5:
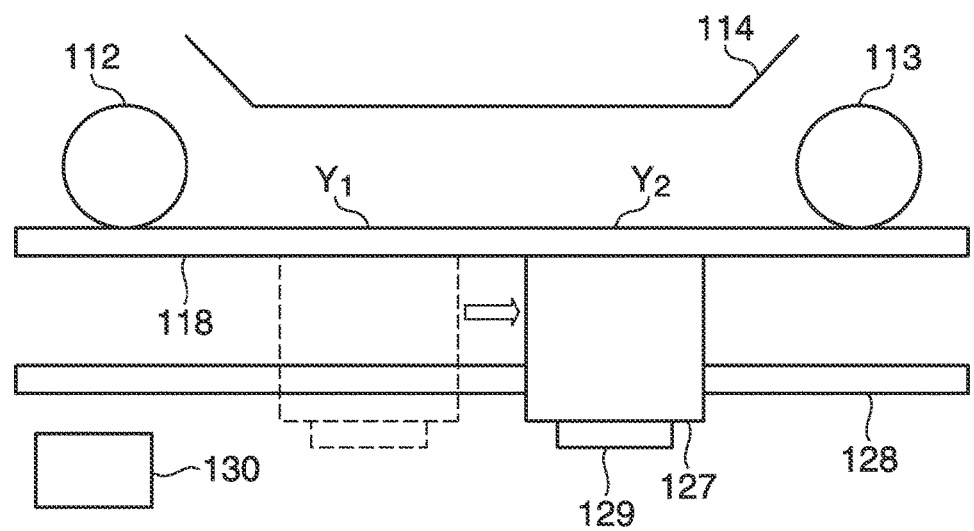
FIG. 5 is an enlarged cross-sectional view showing an arrangement of a reading area and its vicinity in the image reading apparatus in FIG. 1.

FIG. 5 is an enlarged cross-sectional view showing an arrangement of the reading area and its vicinity in the image reading position 100 in FIG. 1. Referring to FIG. 5, the white color opposed member 114 is read while the reading unit 127 is being moved from a candidate reading position $Y_1$ to a candidate reading position $Y_2$ on the reading glass 118, and as a result, a read image in FIG. 6 is obtained.

Figure 6:
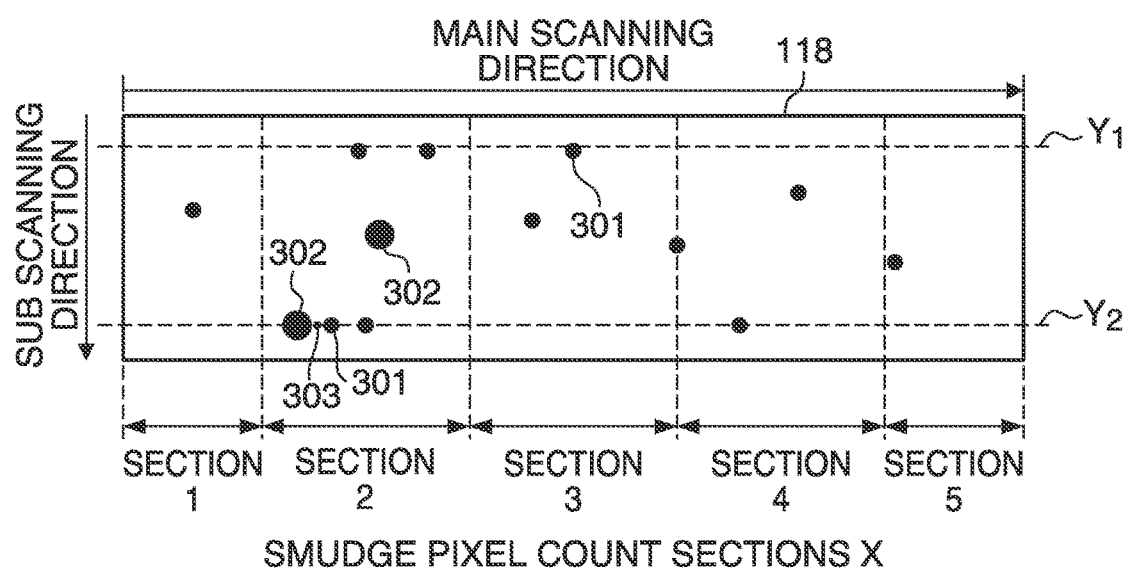
FIG. 6 is an image view showing smudges adhered to a reading glass when an image has been read by moving a reading unit from a candidate reading position $Y_1$ to a candidate reading position $Y_2$.

FIG. 6 is an image view showing smudges adhering to the reading glass 118 when an image has been read by moving the reading unit 127 from the candidate reading position $Y_1$ to the candidate reading position $Y_2$ on the reading glass 118. Sections 1 to 5 are separated in the main scanning direction so that each section can include 64 pixels (0.042 mm×64) where the resolution of the image reading unit 127 is 600 dpi. However, the number of sections and the number of pixels in each section should not be particularly limited.

Referring to FIG. 6, a plurality of smudges 301 to 303 are adhered to the reading glass 118 from the candidate reading position $Y_1$ to the candidate reading position $Y_2$.

In moving original reading which reads an image off an original being conveyed by an ADF, the image is read when the original being conveyed passes through a predetermined reading position on the reading glass 118. Thus, conveying an original may cause smudges, such as sheet powders adhered to the original or toners which are developing agents, to adhere to the reading glass 118.

Figure 7A:
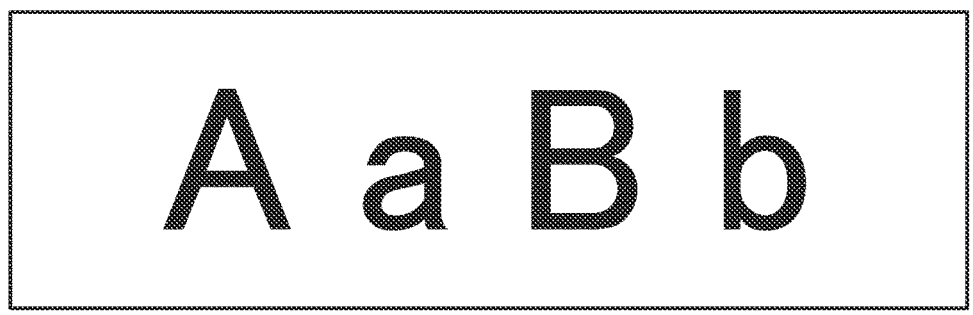
FIG. 7A is a view showing an image read off an original when there is no smudge at a reading position.

Even when smudges adhere to the reading glass 118, an image read off an original is, for example, as shown in FIG. 7A as long as there is no smudge at a reading position. FIGS. 7A to 7E are views showing images read off an original, and FIG. 7A shows an image read off an original when there is no smudge adhered to a reading position.

Figure 7B:
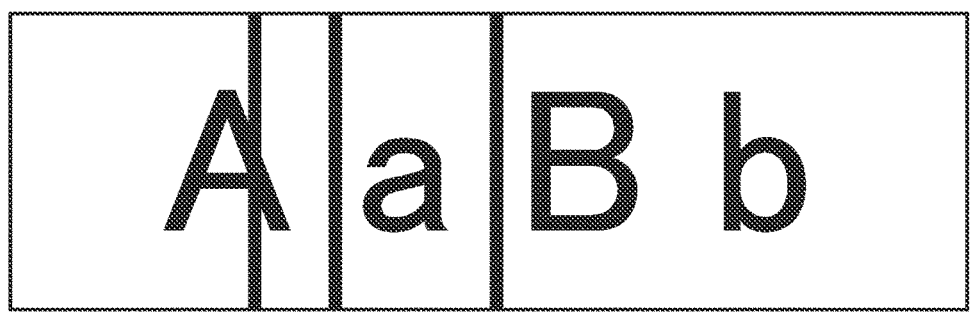
FIG. 7B is a view showing an image read off an original when there are smudges at a reading position.

On the other hand, when a reading position is set at the candidate reading position $Y_1$ in FIG. 6, an image read off an original is, for example, as shown in FIG. 7B because smudges are adhered to the candidate reading position $Y_1$. FIG. 7B shows an image read off an original in which smudges are adhered to a reading position. In FIG. 7B, three vertical streaks which are abnormal images appear at positions in the main scanning direction which correspond to three smudges 301 adhered to the candidate reading position $Y_1$ in FIG. 6.

Figure 7C:
FIG. 7C is a view showing an image read off an original when there is a section in which the density of smudges is not less than a predetermined smudge adhering density.

On the other hand, when a reading position is set at the candidate reading position $Y_2$ in FIG. 6, an image read off an original is, for example, as shown in FIG. 7C because there are a large smudge 302, a small smudge 303, and smudges 301 of a size intermediate therebetween at the candidate reading position $Y_2$. FIG. 7C shows an image read off an original in which a plurality of vertical streaks corresponding to a plurality of smudges adhered to a reading position appear. In FIG. 7C, thick vertical streaks, a thin vertical streak, and vertical streaks of a thickness therebetween appear at positions in the main scanning direction which respectively correspond to the large smudge 302, the small smudge 303, and the smudges 301 adhered to the candidate reading position $Y_2$ in FIG. 6.

When a vertical streaks arising from a smudge appears in an image read off an original, image processing (hereafter referred to as "the vertical streak correction process") for eliminating the influence of the smudge is performed. Although the vertical streak correction process will be described later in further detail, a character, an image, or the like in a background of an image read off an original may become illegible when a certain amount of smudges are densely adhered.

Thus, in the present embodiment, a smudge adhering density at which a character, an image, or the like in a read image start to become illegible even if subjected to the vertical streak correction process is defined as a predetermined smudge adhering density as below. The smudge adhering density is, for example, M/N when M smudges exist in one of sections each including N pixels in the main scanning direction. In the present embodiment, when the resolution of the reading unit 127 is 600 dpi, "3 smudges/64 pixels" is used as the predetermined smudge adhering density in a step S4, to be described later. Namely, "N pixels=64 pixels (0.042 mm×64) and M smudges=3 smudges" is used.

In the present embodiment, one line is divided into sections each including N pixels. The number of smudges is counted for each section, and a result of counting is used as the smudge adhering density. Moreover, it is judged whether the result of counting is not less than M pixels.

Referring to FIG. 4 again, after measuring the number of smudges $D_X$ adhered to each predetermined section (64 pixels) determined in advance (step S3), the CPU 803 judges whether or not there is any section in which its smudge adhering density is not less than the predetermined smudge adhering density (step S4).

Table 1 shows results obtained by measuring the number of smudges included in each of sections at the candidate reading position $Y_1$ and the candidate reading position $Y_2$ in FIG. 6.

TABLE 1

| Candidate reading position | Section 1 | Section 2 | Section 3 | Section 4 | Section 5 |
|---|---|---|---|---|---|
| $Y_1$ | 0 | 2 | 1 | 0 | 0 |
| $Y_2$ | 0 | 4 | 0 | 1 | 0 |

In Table 1, at the candidate reading position $Y_1$, the number of smudges in the section 1 is 0, the number of smudges in the section 2 is 2, the number of smudges in the section 3 is 1, the number of smudges in the section 4 is 0, and the number of smudges in the section 5 is 0. On the other hand, at the candidate reading position $Y_2$, the number of smudges in the section 1 is 0, the number of smudges in the section 2 is 4, the number of smudges in the section 3 is 0, the number of smudges in the section 4 is 1, and the number of smudges in the section 5 is 0. When the number of smudges measured in a given section is large, this means that smudges are dense in this section, that is, this section has a high smudge adhering density.

At the candidate reading position $Y_1$, the number of sections in which their smudge adhering density reaches the predetermined smudge adhering density is zero, and at the candidate reading position $Y_2$, the number of sections in which their smudge adhering density reaches the predetermined smudge adhering density is one. Thus, as can be seen from FIG. 6, when a reading position is set at the candidate reading position $Y_1$, the influence of smudges is likely to be eliminated by carrying out the vertical streak correction process.

When the CPU 803 judges in the step S4 that there is any section in which its smudge adhering density is not less than the predetermined smudge adhering density ("YES" in the step S4), the process proceeds to step S5. Specifically, the CPU 803 compares the detected number of sections in which their smudge adhering densities are not less than the predetermined smudge adhering density with a minimum value Dmin of the number of sections in which their smudge adhering densities are not less than the predetermined smudge adhering density at other candidate reading positions checked hitherto and judges whether or not the number of sections in which their smudge adhering density are not less than the predetermined smudge adhering density at the present candidate reading position is the smallest. It is assumed that the minimum value Dmin of the number of sections in which their smudge adhering densities are not less than the predetermined smudge adhering density at other candidate reading positions checked hitherto is stored in, for example, the RAM 805.

When the CPU 803 judges in the step S5 that the number of sections in which their smudge adhering density are not less than the predetermined smudge adhering density at the present candidate reading position is less than the minimum value Dmin stored in the RAM 805 ("YES" in the step S5), the process proceeds to step S6. Specifically, the CPU 803 updates data stored in the RAM 805 and indicative of a candidate reading position and a minimum value of the number of sections in which their smudge adhering density are not less than the predetermined smudge adhering density with data $Y_n$ indicative of the present candidate reading position and data Dmin indicative of the number of sections in which their smudge adhering density are not less than the predetermined smudge adhering density (step S6). It should be noted that when the present candidate reading position is a first candidate reading position, the data $Y_n$ indicative of the present candidate reading position and the data Dmin indicative of the number of sections in which their smudge adhering density are not less than the predetermined smudge adhering density are stored in the RAM 805.

After updating the data indicative of a candidate reading position and the number of sections in which their smudge adhering density are not less than the predetermined smudge adhering density, the CPU 803 judges whether or not the present candidate reading position is a last candidate reading position (step S7). When the CPU 803 judges in the step S7 that the present candidate reading position is a last candidate reading position ("YES" in the step S7), the process proceeds to step S8. Specifically, the CPU 803 determines, as a reading position, a candidate reading position at which the number of sections in which their smudge adhering densities are not less than the predetermined smudge adhering density is the smallest, and moves the reading unit 127 to this candidate reading position (step S8).

Assume that the present candidate reading position is, for example, $Y_2$ in FIG. 6, and at a point in time when reading of an image at the candidate reading position $Y_2$ is completed, the reading unit 127 lies at the position $Y_2$ in FIG. 6. In this case, in order to determine the candidate reading position $Y_1$ as a reading position, the reading unit 127 is moved back once to a reference position at which the flag sensor 130 lies, and the reading unit 127 is moved from the reference position by an amount corresponding to the number of required motor steps. This reliably moves the reading unit 127 to the candidate reading position $Y_1$.

After moving the reading unit 127 to a desired candidate reading position, the CPU 803 provides control to start conveyance of an original, read an image off the original at this candidate reading position, subject the read image to the vertical streak correction process (step S9), and terminate the present process. The vertical streak correction process will be described later in detail as a subroutine of the step S9.

When conveyance of an original is started, various sensors provided on the conveying path 90 send the CPU 803 flag signals indicating that the original has passed. Based on the received flag signals, the CPU 803 controls the timer 806 to start counting time, and controls the line sensor 125 of the reading unit 127 to start reading the original in accordance with a time at which the original reaches a reading position, and as a result, an image is read off the original.

On the other hand, when the CPU 803 judges in the step S7 that the present candidate reading position is not a last candidate reading position ("NO" in the step S7), the process returns to the step S2, and the sequential process from the step S2 to the step S6 is carried out again.

When the CPU 803 judges in the step S4 that there is no section with a smudge adhering density not less than the predetermined smudge adhering density at the present candidate reading position ("NO" in the step S4), the CPU 803 determines the present candidate reading position as a reading position (step S10), followed by the process proceeding to the step S8. Also, when the CPU 803 judges in the step S5 that the number of sections having smudge adhering densities not less than the predetermined smudge adhering density is not the smallest ("NO" in the step S5), the process proceeds to the step S7. As a result, a candidate reading position at which the number of sections having smudge adhering densities not less than the predetermined smudge adhering density is not the smallest is excluded from candidates for a reading position.

According to the process in FIG. 4, a candidate reading position is divided into a plurality of sections, and whether or not there are smudges with the predetermined smudge adhering density or higher is judged on a section-by-section basis, and a candidate reading position at which the number of sections in which a smudge adhering density is not less than the predetermined smudge adhering density is the smallest is determined as a reading position. This corrects for vertical streaks arising from smudges and eliminates the influence thereof, and therefore, vertical streaks arising from smudges are unlikely to appear, and an image read off an original is unlikely to be adversely affected by image correction.

Although in the above description of the present embodiment, there are two candidate reading positions $Y_1$ and $Y_2$, the number of candidate reading positions is not limited to two. Namely, an area between the candidate reading positions $Y_1$ and $Y_2$ may be read in units of one pixel (0.042 mm at a time when the resolution is 600 dpi) or in units of six pixels (0.254 mm at a time when the resolution is 600 dpi), and each position may be used as a candidate reading position.

Moreover, in the present embodiment, when all candidate reading positions are excluded from candidates as a result of selection of a reading position, a first candidate reading position set in advance may be determined as a reading position. Also, when there is any candidate reading position at which no section having a smudge adhering density not less than the predetermined smudge adhering density is found during execution of a reading position determination process, detection and measurement of smudges at subsequent candidate reading positions may be canceled, and the candidate reading position at which no section having a smudge adhering density not less than the predetermined smudge adhering density is found may be determined as a reading position.

A description will now be given of the smudge detection process which is carried out in the step S3 in FIG. 4.

Figure 8:
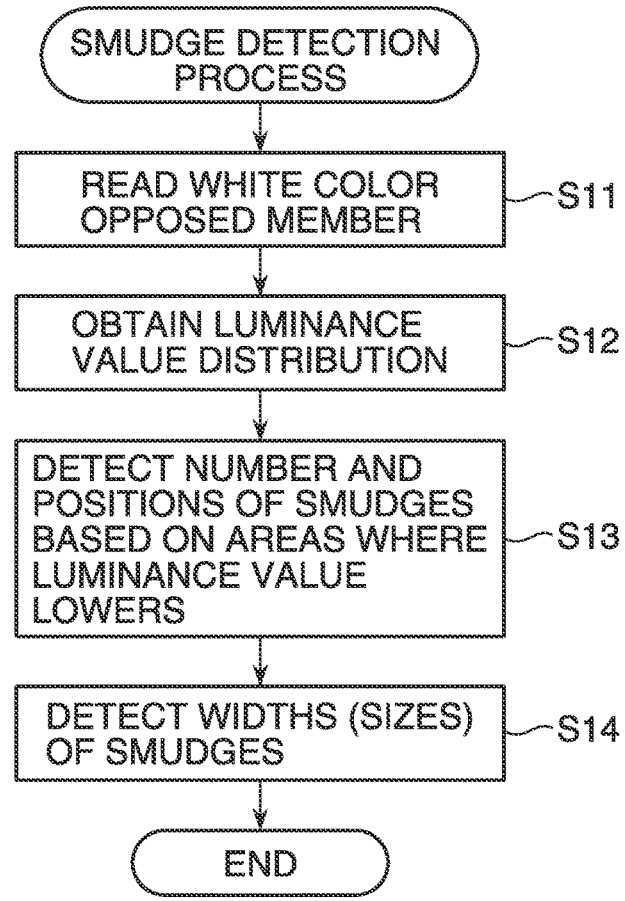
FIG. 8 is a flowchart showing the procedure of a smudge detection process which is carried out in step S3 in FIG. 4.

FIG. 8 is a flowchart showing the procedure of the smudge detection process which is carried out in the step S3 in FIG. 4. The smudge detection process is carried out by the CPU 803 of the image reading apparatus 100 in accordance with a smudge detection process program stored in the ROM 804.

Referring to FIG. 8, the CPU 803 controls the reading unit 127, which has been moved to a candidate reading position, to read the white color opposed member 114 at this candidate reading position (step S11). The CPU 803 then obtains a luminance value distribution for the image data, which is read off the original by the reading unit 127 and input to the control unit 802 via the analog processing circuit 809, the A/D converter 810, and the image processing unit 811 (step S12).

Figure 9:
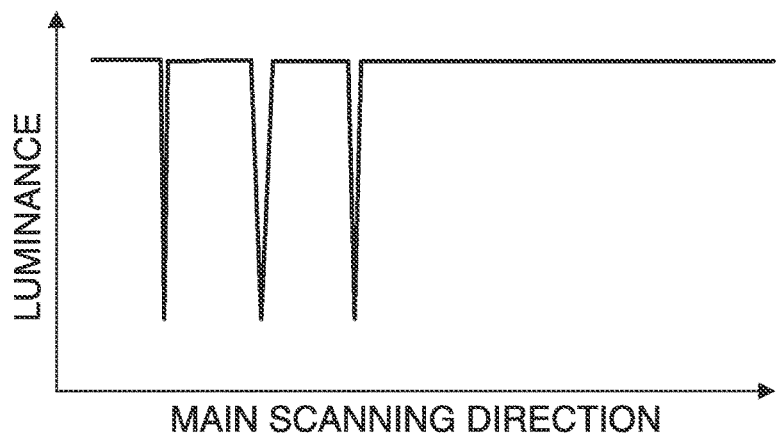
FIG. 9 is a view showing a luminance value distribution at a candidate reading position.

FIG. 9 is a view showing a luminance value distribution at a candidate reading position.

In FIG. 9, in areas where there are smudges, luminance values of pixels corresponding to the smudges are lowered because the amount of reflected light decreases due to the smudges blocking light radiated from a light source. On the other hand, in areas where there are no smudges, the white color opposed member 114 is read, and hence the amount of reflected light does not decrease, and luminance values of pixels corresponding to the areas are maintained high.

After obtaining the luminance value distribution, the CPU 803 judges whether or not there are smudges based on the presence or absence of areas where luminance is lowered in the luminance value distribution and determines the number of smudges based on the number of areas where luminance is lowered. The CPU 803 also determines positions of the smudges based on the areas where luminance is lowered. Moreover, the CPU 803 counts the number of smudges for each section based on the positions of the smudges (step S13). As can be seen from FIG. 9, three smudges are adhered to the candidate reading position since there are three areas where luminance is lowered. Positions of the three smudges are found based on positions of the areas where luminance is lowered.

The CPU 803 then counts the number of smudges successive in the main scanning direction based on the positions of the smudges (step S14) and terminates the present smudge detection process. The number of smudges successive in the main scanning direction corresponds to the width (size) of the smudge.

According to the smudge detecting process in FIG. 8, luminance values of respective pixels in the line sensor 125 at a candidate reading position are obtained, and based on positions of pixels in which luminance is lowered, the presence or absence of smudges, the number of smudges, and adhering positions of the smudges are accurately detected. Moreover, sizes of the smudges are accurately detected based on widths of areas where luminance is lowered in FIG. 9.

A description will now be given of the vertical streak correction process which is carried out in the step S9 in FIG. 4.

Figure 10:
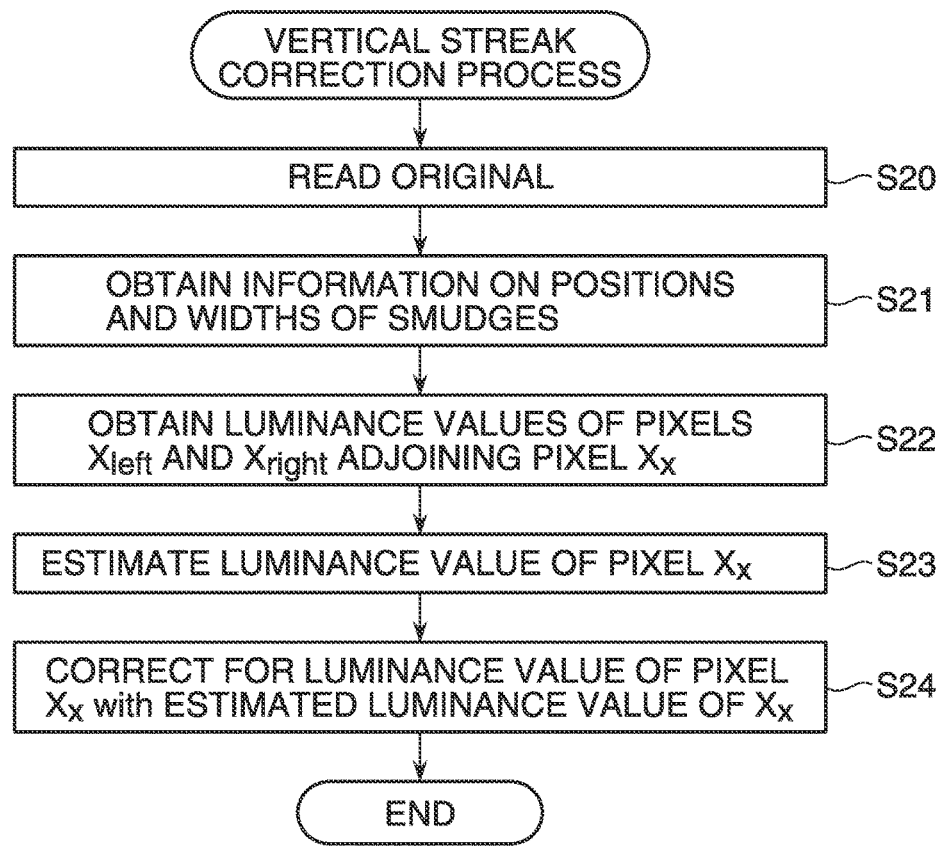
FIG. 10 is a flowchart showing the procedure of a vertical streak correction process which is carried out in step S9 in FIG. 4.

FIG. 10 is a flowchart showing the procedure of the vertical streak correction process which is carried out in the step S9 in FIG. 4. The vertical streak correction process is carried out by the CPU 803 of the image reading apparatus 100 in accordance with a vertical streak correction process program stored in the ROM 804.

Figure 11:
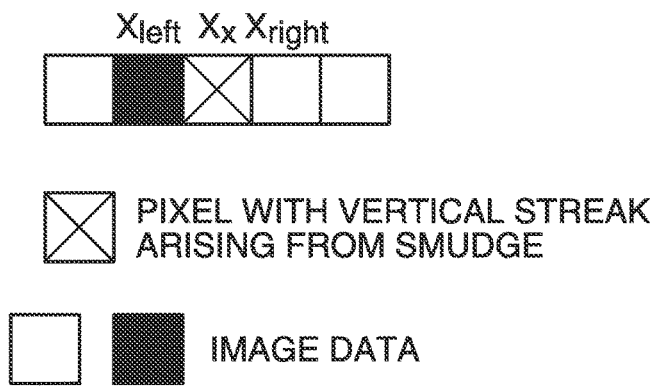
FIG. 11 is a view showing a pixel $X_X$ corresponding to a vertical streak.

Referring to FIG. 10, at first, the CPU read an original (step S20). The CPU 803 then performs the vertical streak correction process with respect to image data (luminance value) obtained by reading the original. The CPU 803 then obtains information on positions and widths of smudges corresponding to the candidate reading position to which the reading unit 127 has been moved in the step S8 (step S21). The positions and width of the smudges are obtained in the smudge detection process shown in FIG. 8. FIG. 11 is a view showing the pixel $X_X$ corresponding to the vertical streak (the positions of the smudges). The CPU 803 then obtains luminance values of a pixel $X_{left}$ and a pixel $X_{right}$ adjoining the pixel $X_X$ in the main scanning direction (step S22). The pixel $X_{left}$ and the pixel $X_{right}$ are pixels corresponding to positions in which smudges are not detected. In a case where the width of the smudge corresponds to two pixels, the pixel Xx and the pixel $X_{x+1}$ are regarded as the vertical streak. In this case, $X_{right}$ corresponds to $X_{x+2}$. After obtaining the luminance values of the pixel $X_{left}$ and the pixel $X_{right}$, the CPU 803 estimates the luminance value of the pixel $X_x$ according to an equation (1) below using the obtained luminance values of the pixel $X_{left}$ and the pixel $X_{right}$ (step S23).

$$X_X = X_{left} + (X_{right} - X_{left})/(n+1) \times x \qquad (1)$$

n: width of streak
x: distance from $X_{left}$

Figure 12:
FIG. 12 is a view showing the pixel $X_X$ corresponding to the vertical streak after estimate of a luminance value.

FIG. 12 is a view showing the pixel $X_X$ corresponding to the vertical streak after estimate of the luminance value. The CPU 803 stores the luminance value after estimate as the luminance value (image data) of the pixel Xx, and corrects for the luminance value of the pixel Xx with the estimated luminance value of the pixel Xx (step S24). This processing is carried out for respective positions of the smudges. A vertical streak which is subjected to the vertical streak correction process is determined as appropriated based on a size of a corresponding smudge.

Figure 7D:
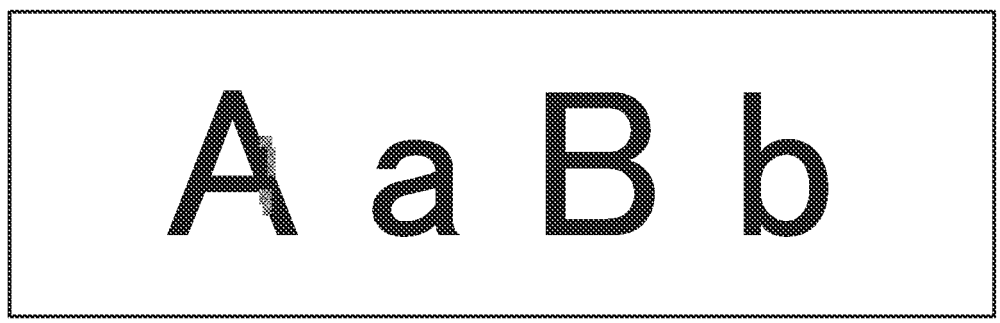
Figure 7E:
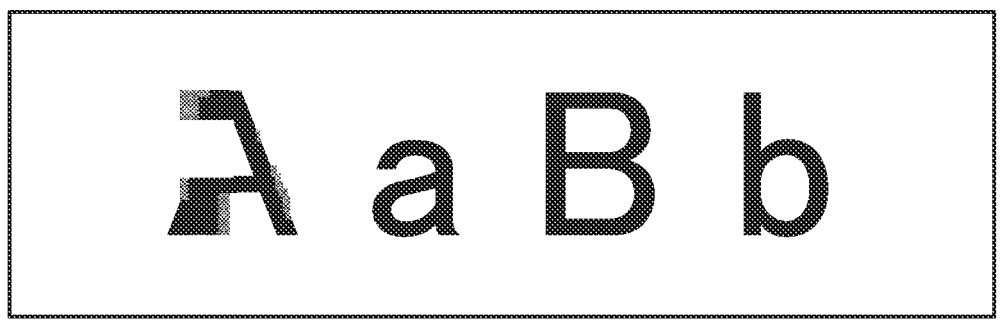

For example, subjecting the read images in FIGS. 7B and 7C described above to the vertical streak correction process obtains the images in FIGS. 7D and 7E, respectively. As can be seen from FIGS. 7D and 7E, the influence of smudges is considerably reduced by the vertical streak correction process.

As is apparent from FIGS. 7D and 7E, the influence of smudges on an image read off an original depends on not only the number of smudges (the number of vertical streaks) but also the adhering density of the smudges. That is, the influence of smudges on the image read of the original depends on not only the number of smudges in one line but also the number of smudges (maximum value) in a section. Thus, when determining a reading position, it is preferable not to select a candidate reading position at which the number of adhering smudges is small but to determine, as a reading position, a candidate reading position with a low smudge adhering density.

According to the vertical streak correction process in FIG. 10, a luminance value of a pixel corresponding to a vertical streak is estimated using luminance values of pixels around it, and the vertical streak is corrected for based on the estimated luminance value. Therefore, vertical streaks appearing due to the presence of smudges can effectively be corrected for as long as the adhering density of smudges is not more than the predetermined smudge adhering density.

A description will now be given of a second embodiment.

A hardware arrangement of an image reading apparatus according to the second embodiment is the same as that of the image reading apparatus according to the first embodiment, and they differ only in control arrangements. The following description of an image reading process carried out in the present embodiment focuses on differences from the image reading process (FIG. 4) in the first embodiment.

The image reading process according to the present embodiment is carried out by the CPU 803 of the image reading apparatus 100 in accordance with an image reading process program stored in the ROM 804.

Figure 13:
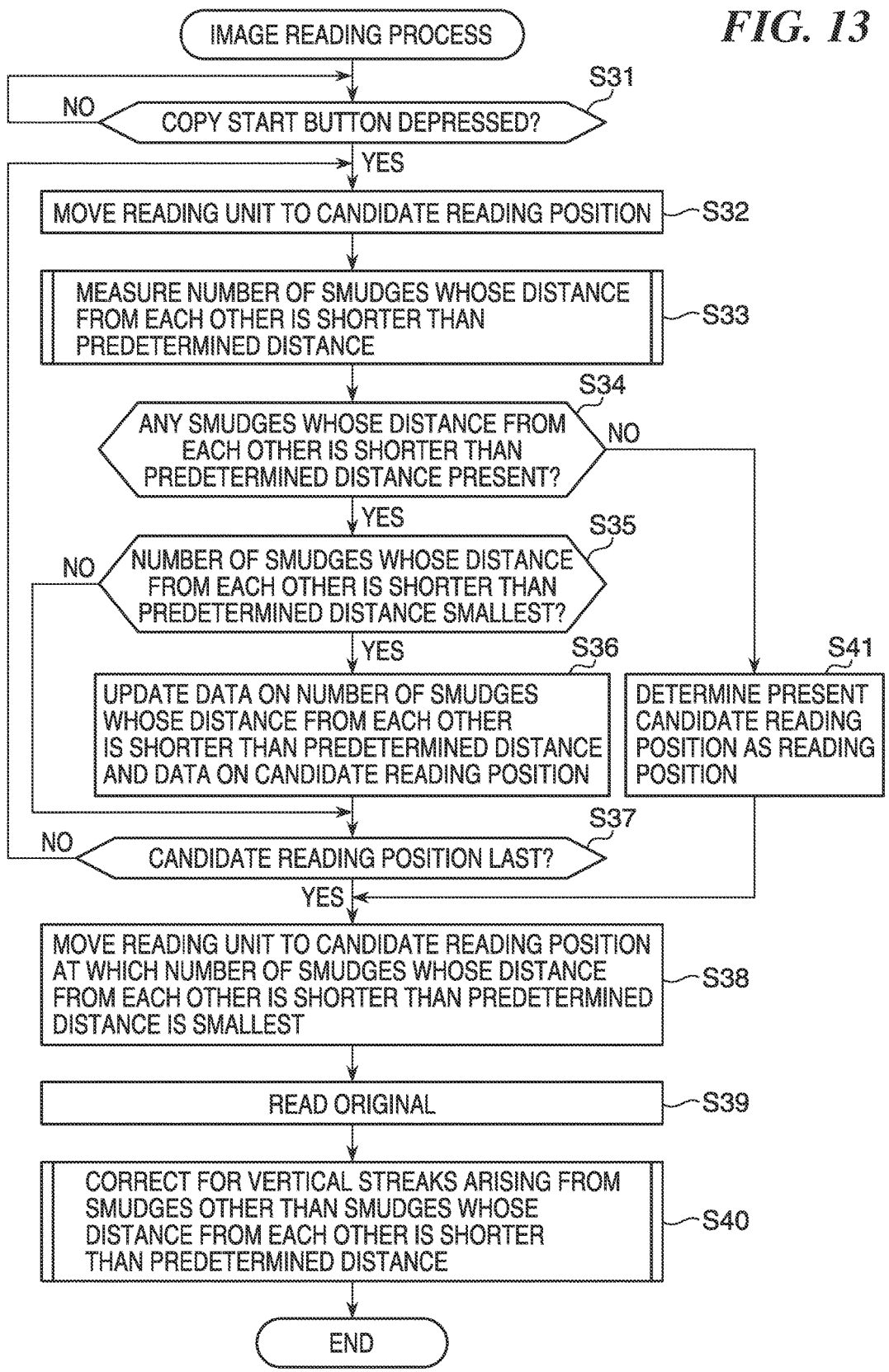
FIG. 13 is a flowchart showing the procedure of an image reading process which is carried out in a second embodiment.

FIG. 13 is a flowchart showing the procedure of the image reading process which is carried out in the present embodiment. In this image reading process, a useful image is read by eliminating the unfavorable influence of image correction to the extent possible even at a reading position at which an area with high smudge adhering density cannot be avoided.

In FIG. 13, processes in steps S31 and S32 are the same as those in the steps S1 and S2 in the first embodiment (FIG. 4). Also, a smudge detection process and a vertical streak correction process are the same as those in the first embodiment described above. Therefore, description thereof is omitted.

After the CPU 803 moves the reading unit 127 from the present position to a candidate reading position (step S32), the process proceeds to step S33, in which the CPU 803 in turn measures the number of smudges whose distance from each other is shorter than a determined distance (step S33). Namely, in the first embodiment, for the candidate reading positions $Y_1$ and $Y_2$, smudge adhering densities are measured for respective sections determined in advance in a scanned image, whereas in the present embodiment, the number of smudges whose distance from each other is shorter than a predetermined distance is measured. Specifically, in the step S13 in FIG. 8, the positions of the smudges are determined based on areas where luminance is lowered, and a distance between a smudge concerned and the next smudge in a predetermined direction is calculated. Then, the number of distances having values less than a predetermined value is counted.

Figure 14:
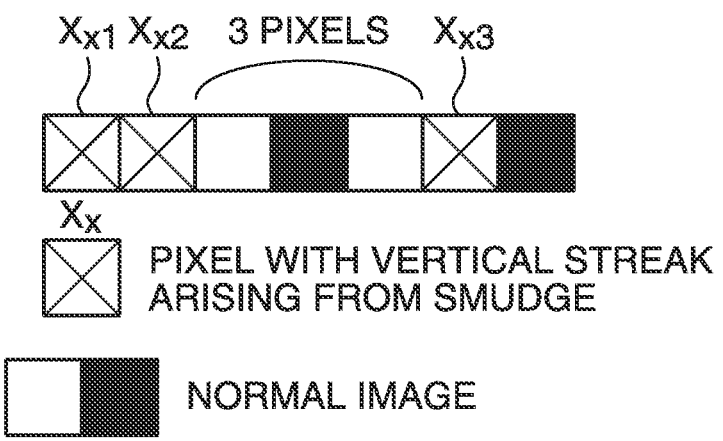
FIG. 14 is a view showing pixels corresponding to smudges whose distance from each other is not more than a predetermined distance at the candidate reading position $Y_2$ in FIG. 6.

FIG. 14 is a view showing pixels corresponding to smudges that adjoin each other at a predetermined interval or less at the candidate reading position $Y_2$ in FIG. 6. In FIG. 14, $X_{X1}$, $X_{X2}$, and $X_{X3}$ are pixels corresponding to the smudges 302, 303, and 301, respectively, in the section 2 in FIG. 6, and they are close to each another at an interval of three pixels or less.

Irrespective of the sizes of smudges adhered to a reading position where an image is read, a character, an image, or the like in a background of an image read off an original after vertical streaks are corrected for may become illegible when the distance between adjoining smudges is equal to or shorter than a predetermined distance. The inventor of the present invention studied the relationship between the image level of a read image and the distance between smudges adhered to a reading position. As a result, the inventor found that such an allowable predetermined distance between smudges as not to make a character, an image, or the like in a background illegible after processing on vertical streaks is three pixels (0.042 mm×3) where the resolution of the reading unit 127 is set at 600 dip, and defined a predetermined distance between smudges as, for example, three pixels.

When the distance between smudges is not more than three pixels, a characters, an image, or the like in a background is likely to become illegible because it is difficult to eliminate the influence of vertical streaks arising from the smudges. On the other hand, when the distance between smudges is not less than three pixels, a character, an image, or the like in a background is unlikely to become illegible because it is easy to eliminate the influence of vertical streaks arising from the smudges.

Referring again to FIG. 13, after measuring the number of smudges whose distance from each other is shorter than a predetermined distance (step S33), the CPU 803 judges whether or not there are any smudges whose distance from each other is shorter than the predetermined distance (step S34).

Table 2 shows results obtained by measuring the number of smudges whose distance from each other is not more than three pixels at the candidate reading positions $Y_1$ and $Y_2$ in FIG. 6.

TABLE 2

| Reading position | The number of smudges whose distance from each other is not more than three pixels |
|---|---|
| $Y_1$ | 0 |
| $Y_2$ | 3 |

In Table 2, the number of smudges whose distance from each other is not more than three pixels at the candidate reading position $Y_1$ is "0", and the number of smudges whose distance from each other is not more than three pixels at the candidate reading position $Y_2$ is "3". It should be noted that when there are many smudges whose distance from each other is not more than three pixels at a candidate reading position, this means that the smudge adhering density is high at this candidate reading position. Thus, in the example shown in FIG. 6, reading at the candidate reading position $Y_1$ obtains an image read off an original with higher quality because smudges with a high adhering density difficult to correct for by the vertical streak correction process are avoided.

When the CPU 803 judges in the step S34 that there are any smudges whose distance from each other is shorter than the predetermined distance ("YES" in the step S34), the process proceeds to step S35. Specifically, the CPU 803 judges whether or not the detected number of smudges ($D_L$) whose distance from each other is shorter than the predetermined distance is smaller than a minimum value (Dmin) of the number of smudges whose distance from each other is shorter than the predetermined distance at other candidate reading positions checked hitherto (step S35). The minimum value of the number of smudges whose distance from each other is shorter than the predetermined distance at other candidate reading positions checked hitherto is stored in, for example, the RAM 805.

When the CPU 803 judges in the step S35 that the detected number of smudges whose distance from each other is shorter than the predetermined distance at the present candidate reading position is the smallest ("YES" in the step S35), the process proceeds to step S36. Specifically, the CPU 803 updates data $Y_n$ indicative of the present candidate reading position and data Dmin indicative of the number of smudges whose distance from each other is shorter than the predetermined distance (S36). It should be noted that when the present candidate reading position is a first candidate reading position, data $Y_n$ indicative of the present candidate reading position and data indicative of the number of smudges whose distance from each other is shorter than the predetermined distance are updated.

After updating data indicative of the present candidate reading position and data indicative of the number of smudges whose distance from each other is shorter than the predetermined distance (step S36), the CPU 803 judges whether or not the present candidate reading position is a last candidate reading position (step S37). When the CPU 803 judges in the step S37 that the present candidate reading position is a last candidate reading position ("YES" in the step S37), the process proceeds to step S38. Namely, the CPU 803 determines, as a reading position, a candidate reading position at which the number of smudges whose distance from each other is shorter than the predetermined distance is the smallest, and moves the reading unit 127 to this candidate reading position (step S38).

Assume that the present candidate reading position is, for example, $Y_2$ in FIG. 6, and at a point in time when reading of an image at the candidate reading position $Y_2$ is completed, the reading unit 127 lies at the position $Y_2$ in FIG. 6. In this case, in order to determine the candidate reading position $Y_1$ as a reading position, the reading unit 127 is moved back once to a reference position at which the flag sensor 130 lies, and the reading unit 127 is moved from the reference position by an amount corresponding to the number of required motor steps. This reliably moves the reading unit 127 to the candidate reading position $Y_1$.

After moving the reading unit 127 to a desired candidate reading position (step S38), the CPU 803 stars conveying an original and reads an image off the original at this candidate reading position (step S39).

The CPU 803 then carries out the vertical streak correction process (S21 to S24 in FIG. 10) on smudges that are foreign objects other than foreign objects whose distance from each other is shorter than a predetermined distance, leaves smudges whose distance from each other is shorter than the predetermined distance as they are without correction (step S40), and terminates the process.

In the first embodiment described above, a candidate reading position at which the number of sections having smudge adhering densities not less than a predetermined smudge adhering density is the smallest is determined as a reading position, and for an image read off an original at this reading position, the vertical streak correction process in which vertical streaks arising from smudges are corrected for is carried out. On the other hand, in the present embodiment, a candidate reading position at which the number of smudges whose distance from each other is shorter than a predetermined distance is the smallest is determined as a reading position, and in an image read off an original at this reading position, vertical streaks arising from smudges other than smudges whose distance from each other is shorter than the predetermined distance are corrected for. Vertical streaks arising from smudges whose distance from each other is shorter than the predetermined distance are left as they are without being corrected for. As a result, even at a candidate reading position with such a high smudge adhering density that smudges cannot be avoided, the vertical streak correction process is efficiently carried out to obtain a read image that is legible.

In a normal vertical streak correction process carried out at a candidate reading position at which a relatively large amount of smudges are attached and smudges are unavoidable, when vertical streaks arising from smudges whose distance from each other is shorter than a predetermined distance are corrected for, another vertical streak close to those vertical streaks may be corrected for. Specifically, when the vertical streak correction process is carried out on the read image in FIG. 7C, for example, the read image in FIG. 7E may be generated. This vertical streak correction process makes a character or an image even more illegible.

Accordingly, in the present embodiment, a candidate reading position at which the number of smudges whose distance from each other is shorter than a predetermined distance is the smallest is selected, and only vertical streaks arising from smudges other than the smudges whose distance from each other is shorter than the predetermined distance are corrected for. As a result of this, for example, a processed image as shown in FIG. 15 is obtained from the read image in FIG. 7C.

Figure 15:
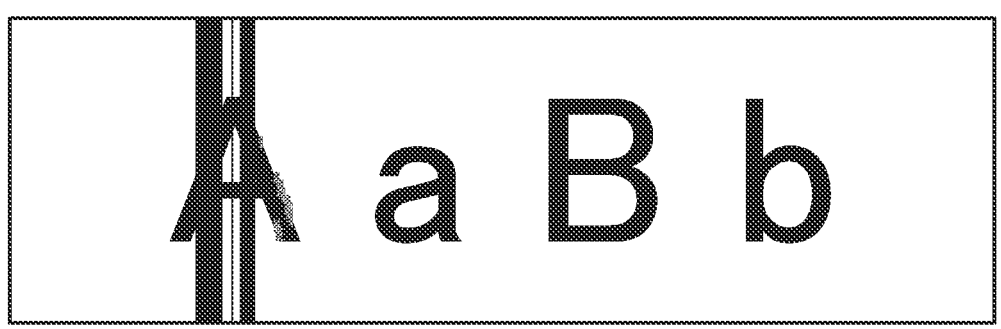
FIG. 15 is a view showing an image read off an original after a vertical streak correction process is carried out on an image read off an original in FIG. 7A.

FIG. 15 is a view showing an image read off an original after the vertical streak correction process is carried out on an image read off an original in FIG. 7C. In FIG. 15, vertical streaks still remain, but an original image is prevented from being made illegible by a vertical streak correction process. This makes the image reading process more practical.

On the other hand, when the CPU 803 judges in the step S37 that the present candidate reading position is not a last candidate reading position ("NO" in the step S37), the process returns to the step S32, and the sequential process from the step S32 to the step S36 is carried out again.

As a result of the judgment in the step S34, when there are no smudges whose distance from each other is shorter than the predetermined distance at the current candidate reading position, the CPU 803 determines the present candidate reading position as a reading position (step S41), followed by the process proceeding to the step S38. Also, when the CPU 803 judges in the step S35 that the number of smudges whose distance from each other is shorter than the predetermined distance is not the smallest ("NO" in the step S35), the process proceeds to the step S37. As a result, a candidate reading position at which the number of smudges whose distance from each other is shorter than the predetermined distance is not the smallest is excluded from candidate for a reading position.

According to the process in FIG. 13, after a candidate reading position at which the number of smudges whose distance from each other is shorter than a predetermined distance is the smallest is selected (step S35), the vertical streak correction process is carried out on vertical streaks arising from smudges other than the smudges whose distance from each other is shorter than the predetermined distance at the candidate reading position. Vertical streaks arising from the smudges whose distance from each other is shorter than the predetermined distance are left as they are without being corrected for. As a result, even at a candidate reading position with a high smudge adhering density, a situation in which a character, an image, or the like in a background of a read image fades to become illegible is avoided by carrying out the vertical streak correction process, and this makes the image reading process more practical.

In the present embodiment, the number of candidate reading positions is not particularly limited. Specifically, a reading area on the reading glass 118 may be read in units of one pixel (0.042 mm at a time where the resolution is 600 dpi) or in units of six pixels (0.254 mm at a time where the resolution is 600 dpi), and each of the reading positions may be used as a candidate reading position.

Moreover, in the present embodiment, when there is any candidate reading positions at which there are no smudges whose distance from each other is shorter than a predetermined distance while a reading position determination process is in progress, detection and measurement of smudges at subsequent candidate reading positions may be canceled, and the candidate reading position may be determined as a reading position.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-032773, filed Feb. 23, 2015 which is hereby incorporated by reference herein in its entirety.

What is claimed is:

1. An image reading apparatus comprising:
   a conveyor configured to convey an original to a reading area;
   a reader configured to read the original at a reading position within the reading area;
   a processor;
   a detection unit configured to detect foreign objects adhered to a plurality of candidate reading positions using image data read at the plurality of candidate reading positions within the reading area by said reader in a state where the original is not being conveyed;
   a count unit configured to count the number of foreign objects adhered to a plurality of sections at each of the candidate reading positions; and
   a determination unit configured to determine a reading position at which the original is read from among the candidate reading positions according to the number of foreign objects adhered to a plurality of sections at each of the candidate reading positions,
   wherein said processor operates to function as said detection unit, said count unit and said determination unit.

2. The image reading apparatus according to claim 1, wherein the sections are obtained by dividing each line of the candidate reading positions into a plurality of sections using the number of pixels which determines a resolution of said reader.

3. The image reading apparatus according to claim 1, wherein said determination unit determines, as the reading position, a candidate reading position at which the number of sections, in which a density of the foreign objects is not less than a predetermined density, is the smallest,
   wherein the density of the foreign objects is a ratio of the number of foreign objects in one section to the number of pixels in the one section.

4. The image reading apparatus according to claim 3, wherein when a candidate reading position, at which the number of sections, in which the density of the foreign objects is not less than the predetermined density, is zero, is found, said determination unit determines this candidate reading position as a reading position and terminates a reading position determination process.

5. The image reading apparatus according to claim 1, further comprising a correction unit configured to correct the image data of the foreign objects based on the image data of a pixel around the foreign object,
wherein said processor operates to function as said correction unit.

6. The image reading apparatus according to claim 1, wherein said reader reads the original while the original is passing through the reading position.

7. The image reading apparatus according to claim 1, wherein the foreign objects comprise sheet powders of the original or developing agents coming off the original.

8. An image reading apparatus comprising:
a conveyor configured to convey an original to a reading area;
a reader configured to read the original at a reading position within the reading area;
a processor;
a detection unit configured to detect foreign objects adhered to a plurality of candidate reading positions using image data read at the plurality of candidate reading positions within the reading area by said reader in a state where the original is not being conveyed;
a count unit configured to count the number of adhering foreign objects whose distance from each other is shorter than a predetermined distance among the foreign objects detected by said detection unit, at each of the candidate reading positions; and
a determination unit configured to determine a reading position at which the original is read from among the candidate reading positions according to the counted number of foreign objects,
wherein said processor operates to function as said detection unit, said count unit and said determination unit.

9. The image reading apparatus according to claim 8, wherein said determination unit determines, as a reading position, a candidate reading position at which the number of foreign objects, whose distance from each other is shorter than the predetermined distance, is the smallest.

10. The image reading apparatus according to claim 9, wherein when a candidate reading position, at which the number of foreign objects, whose distance from each other is shorter than the predetermined distance, is zero, is found, said determination unit determines this candidate reading position as a reading position and terminates a reading position determination process.

11. The image reading apparatus according to claim 8, further comprising a correction unit configured to correct the image data of the foreign objects based on the image data of a pixel around the foreign object,
wherein said processor operates to function as said correction unit.

* * * * *